United States Patent [19]

Mazur et al.

[11] 3,875,193

[45] Apr. 1, 1975

[54] PREPARATION OF HYDROXYLATED STEROIDS

[75] Inventors: Yehuda Mazur, Tel-Aviv; Avner Rotman, Rehovot, both of Israel

[73] Assignee: Yeda Research and Development Co., Ltd., Rehovot, Israel

[22] Filed: Apr. 5, 1973

[21] Appl. No.: 348,229

[30] Foreign Application Priority Data
Apr. 9, 1972  Israel ..................................... 39165

[52] U.S. Cl. ............. 260/397.1, 204/158, 260/397.5
[51] Int. Cl. ......................................... C07c 169/48
[58] Field of Search ....../Machine Searched Steroids

[56] References Cited
UNITED STATES PATENTS 3,183,253   5/1965   Klimstra ........................... 260/397.5
3,325,484   6/1967   Deghenghi ...................... 260/239.55
3,708,511   1/1973   VanVliet et al. ................. 260/397.5

*Primary Examiner*—Henry A. French
*Attorney, Agent, or Firm*—Hubbell, Cohen & Stiefel

[57] ABSTRACT

A process for preparing 14$\beta$-hydroxy derivatives of saturated steroid compounds which comprises dissolving the starting material in a suitable solvent together with peracetic acid and heating the reaction mixture or irradiating it under ultraviolet light at a wavelength below 350 m$\mu$., and separating the desired product from the reaction mixture. The invention also relates to certain new 14$\beta$-hydroxy derivatives of androstane.

1 Claim, 1 Drawing Figure

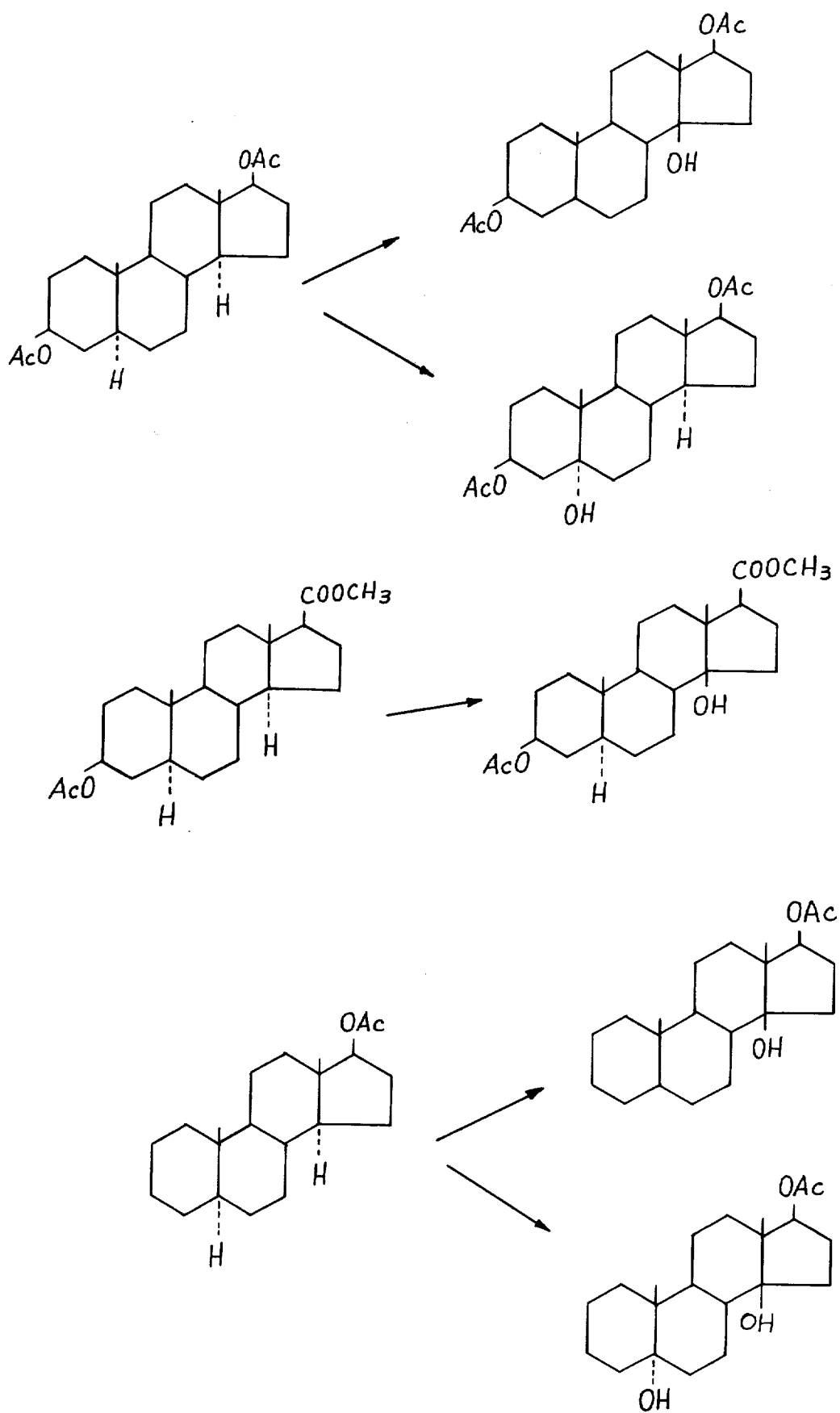

PREPARATION OF HYDROXYLATED STEROIDS

BACKGROUND OF THE INVENTION

Processes for the introduction of 14β-hydroxy groups into steroids are known; see for example Chem. in Britain, 1, (1965) 454. The known processes are rather complicated, and involve a number of steps. The known processes have not attained any practical importance. The novel process according to the present invention is a simple one-step process.

SUMMARY OF THE INVENTION

The invention relates to a process for producing 14β-hydroxylated steroids, comprising dissolving a saturated steroid in a suitable solvent together with peracetic acid and subjecting the reaction mixture to heating or to u.v. irradiation at less than 350 mμ.

For example, irradiation of androstane-17-acetate or of adrostane-3,17-diacetate dissolved with peracetic acid in tertbutanol, results in the formation of the respective 14β-hydroxy and 5α-hydroxy derivatives, which are separated by conventional methods.

In a similar manner, heating or irradiation of 3-acetoxy aethiocholanic acid results in the corresponding 14β-hydroxy derivative. This is easily converted to cardenolide and bufetenolide derivatives in a few simple conventional steps.

Some of the compounds obtained by the process according to the present invention are novel compounds, and as such form part of the invention.

In the following the novel process according to the present invention is exemplified with reference to some saturated steroids, and it is to be understood that these are illustrative only and are to be construed in a non-limitative manner.

EXAMPLE 1

A solution was prepared which consisted of 1.5g of androstane 3β,17β-diacetate, 20 ml. of 15% peracetic acid (in acetic acid) and 100 ml. of tertbutanol. This solution was irradiated for five and a half hours with u.v. of a wavelength of less than 350 mμ.

The resulting solution was subjected to chromatography on silica gel and eluted with ethyl acetate/benzene. In addition to the starting material there was obtained a quantity of 150 mg. of the novel 14β-hydroxy derivative, mp = 156°C, $(\alpha)_{25}^D = -11.6$ and 130 mg. of the known corresponding 5α-hydroxy derivative mp = 179°–180°C $(\alpha)_{25}^D = -8.2$.

EXAMPLE 2

10 ml. of a solution of 40 percent peracetic acid in ethyl acetate were added dropwise over 12 hours to a solution of 1.5 g androstane-3β,17β-diacetate in 10 ml. ethyl acetate, while under reflux.

At the end of this period of time the reaction mixture were worked up as in Example 1. There was obtained 450 mg. of the novel 14β-hydroxy derivative, M.P. = 156°C and 355 mg. of the 5α-hydroxy derivative, M.P. = 179°–180°C.

EXAMPLE 3

A quantity of 1 g of aethiocholanic acid methyl ester 3-acetate were dissolved in 25 ml. ethyl acetate, there was added 3 ml. of 70% peracetic acid in acetic acid, and the reaction mixture was subjected for 4½ hours to u.v. from a lamp emitting at ca. 300 mμ. After chromatography on silica gel and elution with ether:hexane the corresponding 14β-hydroxy derivative was isolated in a 10% yield, m.p. = 194°–195°C, identical with the known derivative.

EXAMPLE 4

A solution of 2.4 g. androstane-17β-acetate in 120 ml. of t-butanol and 30 ml. peracetic acid 15% (in acetic acid) was irradiated for 14 hours with u.v. light of 300 mμ wavelength.

The reaction mixture was diluted with ether, washed consecutively with aqueous sodium bisulfite, sodium bicarbonate and water. The ether extract was evaporated to dryness.

Chromatography on silica gel gave 270 mg. of the known 17β-acetoxy-5α-hydroxy androstane, m.p. = 146°C and 270 mg. of 17β-acetoxy-14β-hydroxy-5α hydroxy-androstane, m.p. = 135°–136°C.

We claim:

1. A process for preparing the 14β-hydroxy derivative of aethiocholanic acid methyl ester-3-acetate which comprises dissolving aethiocholanic acid methyl ester-3-acetate in a suitable solvent therefor together with peracetic acid to form a reaction mixture, subjecting the reaction mixture to heating or irradiation with ultraviolet light having a wavelength below 350 mμ, and separating the desired 14β-hydroxy derivative from the reaction mixture.

* * * * *